United States Patent
Kim (10) Patent No.: US 8,806,065 B2
(45) Date of Patent: Aug. 12, 2014

(54) SERVER DEVICE CONNECTING WITH USB DEVICE AND DEVICE SHARING METHOD

(75) Inventor: Kyung-sik Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 493 days.

(21) Appl. No.: 13/092,480

(22) Filed: Apr. 22, 2011

(65) Prior Publication Data

US 2012/0066361 A1  Mar. 15, 2012

(30) Foreign Application Priority Data

Sep. 14, 2010 (KR) .................. 10-2010-0089745

(51) Int. Cl.
| | |
|---|---|
| *G06F 15/16* | (2006.01) |
| *G06F 13/10* | (2006.01) |
| *G06F 13/38* | (2006.01) |
| *G06F 13/40* | (2006.01) |
| *H04L 29/06* | (2006.01) |
| *H04L 29/12* | (2006.01) |

(52) U.S. Cl.
CPC ............ *G06F 13/102* (2013.01); *G06F 13/385* (2013.01); *G06F 13/404* (2013.01); *H04L 29/06* (2013.01); *H04L 61/2038* (2013.01)
USPC ............ 709/253; 709/203; 709/245; 709/250

(58) Field of Classification Search
CPC ....... G06F 13/14; G06F 13/102; G06F 13/38; G06F 13/382; G06F 13/385; G06F 13/404; G06F 15/16; G06F 15/17; G06F 15/173; H04L 29/06; H04L 61/2007; H04L 61/2038
USPC .................. 709/227–228, 245, 203, 250, 253
See application file for complete search history.

(56) References Cited

U.S. PATENT DOCUMENTS

| | | | |
|---|---|---|---|
| 2004/0103235 A1* | 5/2004 | Liu | ............................ 710/313 |
| 2006/0123166 A1 | 6/2006 | Toebes et al. | |
| 2008/0282011 A1 | 11/2008 | Tsai et al. | |

(Continued)

FOREIGN PATENT DOCUMENTS

WO   2005/033847 A2   4/2005

OTHER PUBLICATIONS

Communication dated Aug. 21, 2013 issued by the European Patent Office in counterpart European Patent Application No. 11163904.3.

(Continued)

*Primary Examiner* — Patrice Winder
(74) *Attorney, Agent, or Firm* — Sughrue Mion, PLLC (57) ABSTRACT

Disclosed are a server device to which a universal serial bus (USB) device is connected, and a device sharing method thereof, the server device capable of sharing the USB device with a client device through a network, the server device including: a USB controller which sets up connection information containing a device address of a connected USB device; and a USB management unit which connects the client device to the USB device by storing the connection information, allocating a virtual connection address for connecting the client device to the USB device, and mapping the virtual connection address with the device address if the client device requests for sharing the USB device. With this, there are provided a server device and a device sharing method, in which the plurality of client devices can have connection and access to the USB device.

17 Claims, 6 Drawing Sheets

(56) References Cited

U.S. PATENT DOCUMENTS

| | | |
|---|---|---|
| 2009/0019187 A1 | 1/2009 | Okuma |
| 2009/0303521 A1* | 12/2009 | Kumar .................. 358/1.15 |
| 2010/0205338 A1* | 8/2010 | Byun ..................... 710/106 |
| 2011/0107003 A1* | 5/2011 | Kang et al. ............. 710/313 |
| 2011/0119666 A1* | 5/2011 | Flynn ..................... 710/305 |
| 2011/0205965 A1* | 8/2011 | Sprigg et al. ........... 370/328 |

OTHER PUBLICATIONS

Takahiro Hirofuchi, "USB/IP: Universal Serial Bus Extension over IP Network", Doctoral Dissertation, Feb. 1, 2007, 120 pgs. total, XP055074883.

* cited by examiner

SERVER DEVICE CONNECTING WITH USB DEVICE AND DEVICE SHARING METHOD

CROSS-REFERENCE TO RELATED APPLICATION

This application claims priority from Korean Patent Application No. 10-2010-0089745, filed on Sep. 14, 2010 in the Korean Intellectual Property Office, the disclosure of which is incorporated herein by reference.

BACKGROUND

1. Field

Apparatuses and methods consistent with the exemplary embodiments relate to a server device connecting with a universal serial bus (USB) device and a device sharing method, and more particularly to a server device and a device sharing method, in which a USB device is sharable with a client device through a network.

2. Description of Related Art

A universal serial bus (USB) is a kind of serial port developed for standardizing an interface for connecting a computer with a peripheral device such as a mouse, a keyboard, a printer, a modem, a speaker, etc. The USB device has been employed as standard equipment for most of current personal computers (PC) since devices can be easily and quickly installed and removed through a USB.

Recently, there have been used USB-over-Internet protocol (IP) or USB-over-network technologies where not only a host device to which the USB device is physically connected but also a remote client device can use the USB device through transmission control protocol/Internet protocol (TCP/IP). Currently, the USB-over-IP technologies have been developed up to commercialized software.

The USB device connected to the host equally operates like a USB device directly connectable to the client device, and has access through a driver and an application of the client device.

The current USB-over-IP technologies allow connection and access of a single client device with regard to one USB device.

SUMMARY

Accordingly, one or more exemplary embodiments provide a server device and a device sharing method, in which a plurality of client devices can have connection and access to a USB device.

Another exemplary embodiment provides a server device and a device sharing method, in which a plurality of client devices can share data of a USB device through data caching.

Still another exemplary embodiment provides a server device and a device sharing method, in which a plurality of client devices can share data of a USB device through data time sharing.

The foregoing and/or other aspects may be achieved by providing a server device capable of sharing a universal serial bus (USB) device with a client device through a network, the server device including: a USB controller which sets up connection information containing a device address of a connected USB device; and a USB management unit which stores the connection information, allocates a virtual connection address for connecting the client device to the USB device and connects the client device to the USB device by mapping the virtual connection address with the device address if the client device requests for sharing the USB device.

The USB management unit may store a network address of the client device, the virtual connection address, and the connection information in a virtual address table.

The USB management unit may transmit the connection information stored in the virtual address table to the client device if the client device requests for sharing a USB device registered in the virtual address table.

The USB management unit may communicate with the USB device through the device address, and communicate with the client device through the virtual connection address.

If a plurality of client devices requests for sharing the USB device, the USB management unit may allocate virtual connection addresses for the plurality of client devices, respectively.

The USB management unit may cache predetermined data included in the client device.

The data may include at least one of a file list, a play list, and a still image.

If a first client device and a second client device request data, the USB management unit may determine whether data requested by the first client device and the second client device is cached, and transmit cached data to at least one of the first client device and the second client device if it is determined that the requested data is cached.

If a first client device and a second client device request data, the USB management unit may transmit data requested by the first client device and data requested by the second client device through time sharing.

Another aspect may be achieved by providing a device sharing method of a server device capable of sharing a universal serial bus (USB) device with a client device through a network, the device sharing method including setting up connection information containing a device address of a connected USB device; storing the connection information if the client device requests for sharing the USB device; allocating a virtual connection address for connecting the client device to the USB device; and mapping the virtual connection address with the device address.

The storing the connection information may include storing a network address of the client device, the virtual connection address, and the connection information in a virtual address table.

The device sharing method may further include communicating with the USB device through the device address, and communicating with the client device through the virtual connection address.

The device sharing method may further include allocating virtual connection addresses for the plurality of client devices, respectively if a plurality of client devices requests for sharing the USB device.

The device sharing method may further include caching predetermined data included in the client device.

The data may include at least one of a file list, a play list, and a still image.

The device sharing method may further include determining whether data requested by the first client device and the second client device is cached, if a first client device and a second client device request for data; and transmitting cached data to at least one of the first client device and the second client device, if it is determined that the requested data is cached.

The device sharing method may further include transmitting data requested by the first client device and data requested by the second client device through time sharing if a first client device and a second client device request for data.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
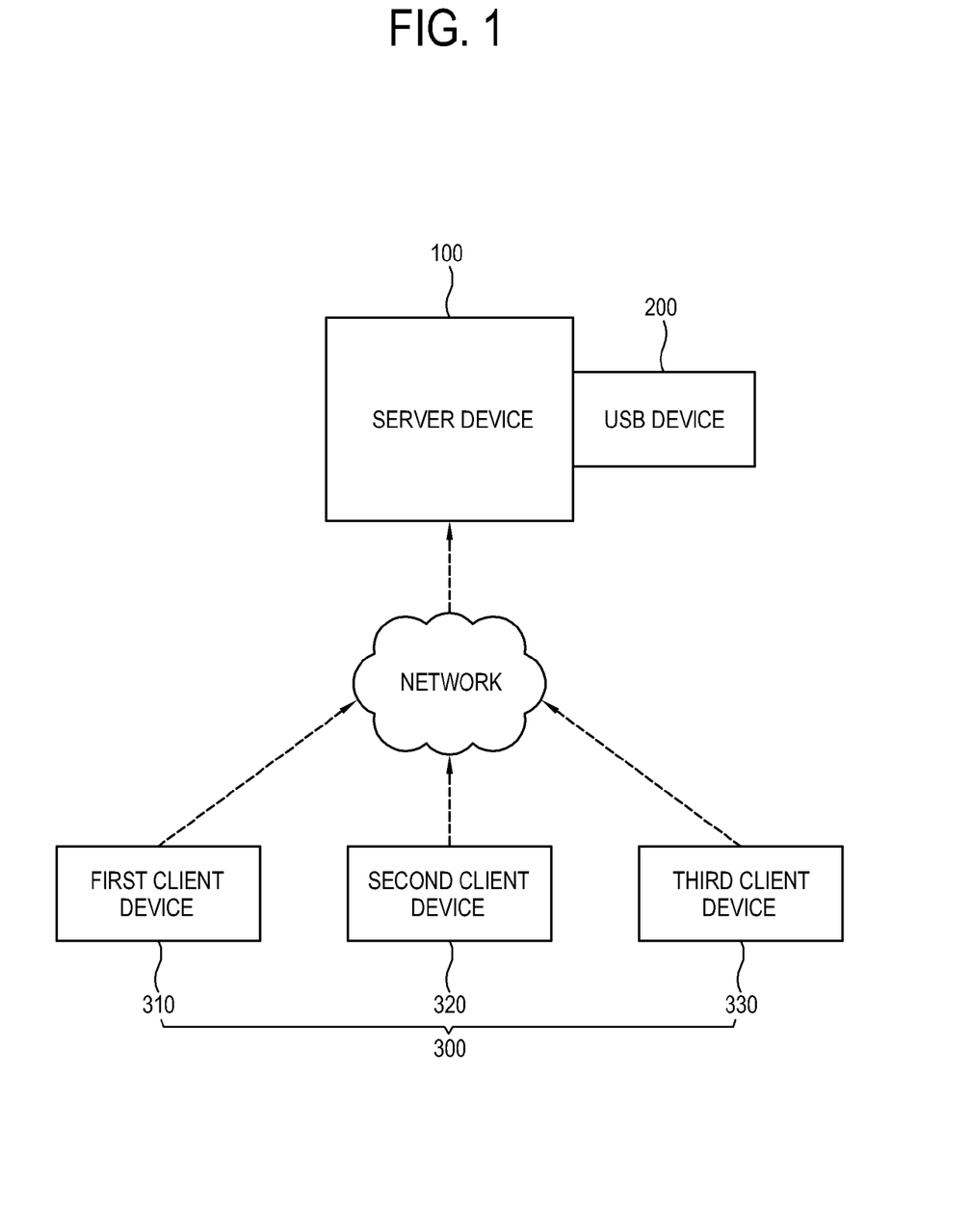
FIG. 1 is a schematic view of a device for explaining a USB device system according to an exemplary embodiment.

FIG. 1 is a schematic view of a device for explaining a universal serial bus (USB) device system. As shown therein, a server device 100 in this exemplary embodiment may connect with a USB device 200 and a plurality of client devices 310, 320 and 330.

The USB device 200 is a peripheral device having a USB interface, which may include a keyboard, a mouse, a printer, a modem, a speaker, a camcorder, a camera, a touch panel, etc.

The server device 100 and the client device 300 may include any electronic device to which the USB device 200 can be connected. The server device 100 and the client device 300 may include a computer system, a television, various mobile terminals, an electronic frame, a personal terminal, etc. The server device 100 refers to a host device to which the USB device 200 is directly connected through an internal or external interface. The client device 300 refers to a host device which can be connected to the USB device 200 via the server device 100. The USB device 200 may be connected to the server device 100 by a USB cable (not shown) or a USB connector (not shown).

As shown therein, the client device 300 is connected to the server device 100 via a network. The network may include one of Internet, Ethernet, a wireless local area network (WLAN), a token ring, etc. The server device 100 in this exemplary embodiment connects with the client device 300 through a transmission control protocol/Internet protocol (TCP/IP). In other words, this exemplary embodiment will be described based on USB-over-IP or USB-over-network technologies where not only a host device to which the USB device is physically connected, but also a remote client device can use the USB device 200 through the TCP/IP. The plurality of client devices 300 can have connection and access to the USB device 200 through the server device 100, which will be described in more detail.

Figure 2:
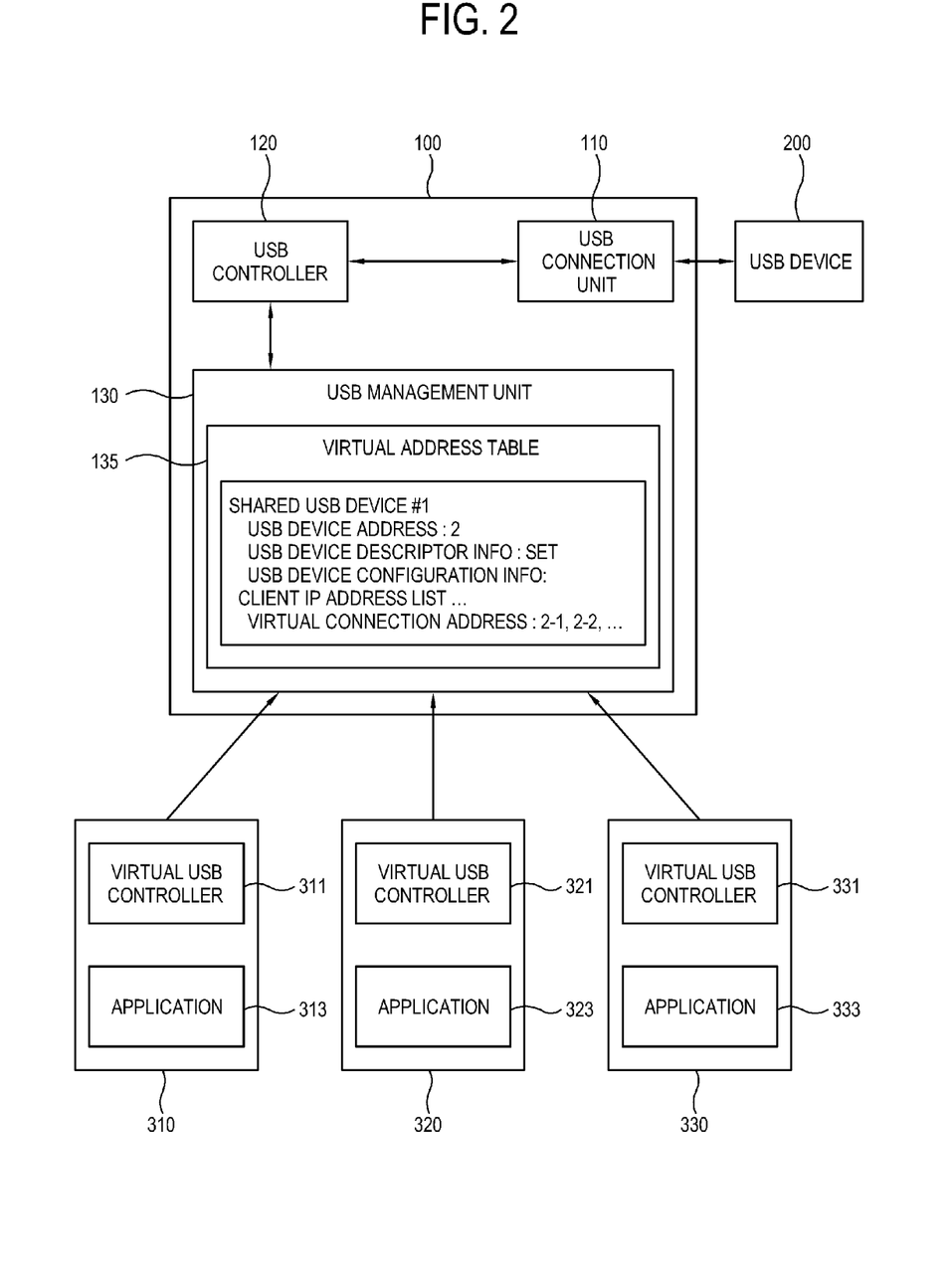
FIG. 2 is a control block diagram of a device for explaining a USB device system according to an exemplary embodiment.

FIG. 2 is a control block diagram of a device for explaining a USB device system according to an exemplary embodiment. As shown therein, the server device 100 includes a USB connection unit 110, a USB controller 120 and a USB management unit 130, and the client device 300 includes virtual USB controllers 311, 321 and 331 and applications 313, 323 and 333. The server device 100 may further include a USB driver (not shown) for driving the connected USB device 200, and a USB-over-IP driver (not shown) for connecting the virtual USB controllers 311, 321 and 331 with the USB device 200 when the client device 300 is connected.

If the USB device 200 is connected to the server device 100 through the USB connection unit 110, the USB controller 120 performs an enumeration process. The enumeration process is a process for determining the endpoint type, the number, the kind, etc. of the USB device 200. In this process, the server device 100 allocates a device address to the USB device 200; and brings and sets up a device descriptor, a configuration descriptor, or the like setup data, i.e., connection information from the USB device 200, thereby preparing for transmitting and receiving data. Such a process is performed by transmitting and receiving the connection information between system software of the server device 100 and a USB logic device of the USB device 200.

When requested by the client device 300 to share the USB device 200, the USB management unit 130 stores the connection information, allocates a virtual connection address for connecting the client device 300 to the USB device 200 and mapping the virtual connection address with the device address, thereby connecting the client device 300 to the USB device 200. Also, the USB management unit 130 stores a network address, i.e., an IP address of the client device 300 that requests the sharing of the USB device 200, and transmits the stored connection information to the client device 300 through the mapped virtual connection address.

The virtual connection address refers to a virtual address generated by the USB management unit 130 for the connection between the client device 300 and the USB device 200. The USB management unit 130 communicates with the USB device 200 through the device address, and communicates with the client device 300 through the virtual connection address. If the plurality of client devices 300 requests the sharing of the USB device 200, the USB management unit 130 respectively allocates the virtual connection addresses corresponding to the plurality of client devices 300.

In a conventional case, if the device address, e.g., "1" is allocated for the data communication between the server device and the USB device and then another host device, i.e., the first client device is connected to the USB device, the address "1" is released and a new device address, e.g., "2" is allocated for the data communication between the first client device and the USB device. Thereafter, if a second client device is connected to the USB device, the address "2" for the first client device is released and a new address "3" is allocated. For the connection between the second client device and the USB device, the enumeration process is newly performed and the new address is allocated. The first client device cannot maintain the connection with the USB device because of the second client device. That is, in the conventional case, when a new client device requests connection with the USB device, the connection between the existing client device and the USB device is released and the new client device is connected, so that the plurality of client devices cannot be connected to the USB device.

On the other hand, according to an exemplary embodiment, if not the server device 100 but the client device 300 is connected to the USB device 200, only one device address is set up and the client device 300 is connected to the USB device 200 through the virtual connection address stored in the USB management unit 130. Thus, the plurality of client devices 300 can maintain the connection with the USB device 200, thereby improving speed and bus efficiency for transmitting and receiving data.

The USB management unit 130 stores a network address, a virtual connection address, and connection information to the USB device 200 corresponding to the client device 300 in a virtual address table (VAT) 135. If the client device 300 requests connection to the USB device 200, which is not registered in the virtual address table (VAT) 135, the USB management unit 130 stores the connection information to the USB device 200 in the virtual address table 135. Then, if a new client device 300 requests connection with the USB device 200 of which the connection information is stored, there is no need for an additional enumeration procedure since the stored connection information can be transmitted to the client device 300.

The virtual USB controllers 311, 321 and 331 of the client device 300 communicate with the USB management unit 130 and controls data communication of the USB device 200 to be connected to the server device 100 through a network.

Applications 313, 323 and 333 refer to software executing a function of the client device 300.

Figure 3:
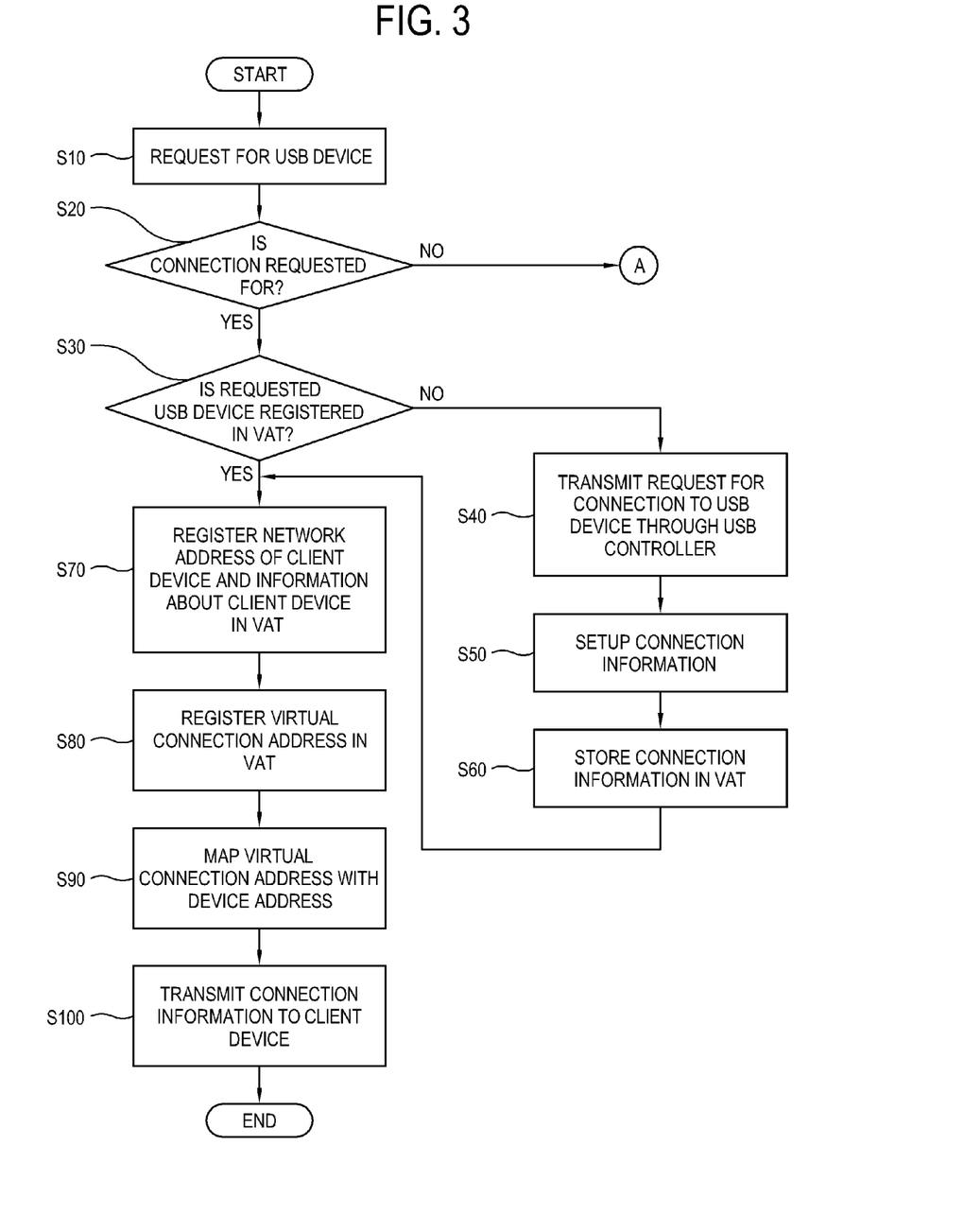
FIG. 3 is a control flowchart for explaining a method where a client device shares a USB device according to an exemplary embodiment.

FIG. 3 is a control flowchart for explaining a method where a client device shares a USB device according to an exemplary embodiment. Referring to FIG. 3, a method, in which the client device 300 shares the USB device 200 through the USB management unit 130, will be described as follows.

First, if the client device 300 requests the USB device 200 (S10), it is determined whether the request is for connection (S20).

When the request is for the connection with the USB device 200, the USB management unit 130 determines whether the USB device 200 requested for the connection is registered in the virtual address table 135 (S30). That is, the USB management unit 130 determines whether the connection request is performed with regard to the USB devices 200 registered in the virtual address table 135.

If the USB device 200 is not registered in the virtual address table 135, the USB management unit 130 transmits the request for the connection to the USB device 200 to the USB controller 120 (S40).

The USB controller 120 that receives the request for the connection to another host device sets up the connection information of the USB device 200 (S50). That is, the USB controller 120 sets up the device address and sets up the setup data such as the device descriptor, the configuration descriptor, etc.

Then, the connection information is stored in the virtual address table 135 (S60).

The USB management unit 130 receives a network address and device information from the client device 300 that requests the connection, and stores them in the virtual address table 135 (S70).

Also, the USB management unit 130 registers a virtual connection address allocated to the client device 300 in the virtual address table 135 (S80), and maps the virtual connection address with the device address (S90).

On the basis of mapping information, the connection information stored in the virtual address table 135 is transmitted to the client device 300, and the client device 300 and the USB device 200 are connected to each other (S100).

If the request to the USB device 200 received from the client device 300 is not a request for the connection but a request A for data transmission, it will be described in the following exemplary embodiment.

Figure 4:
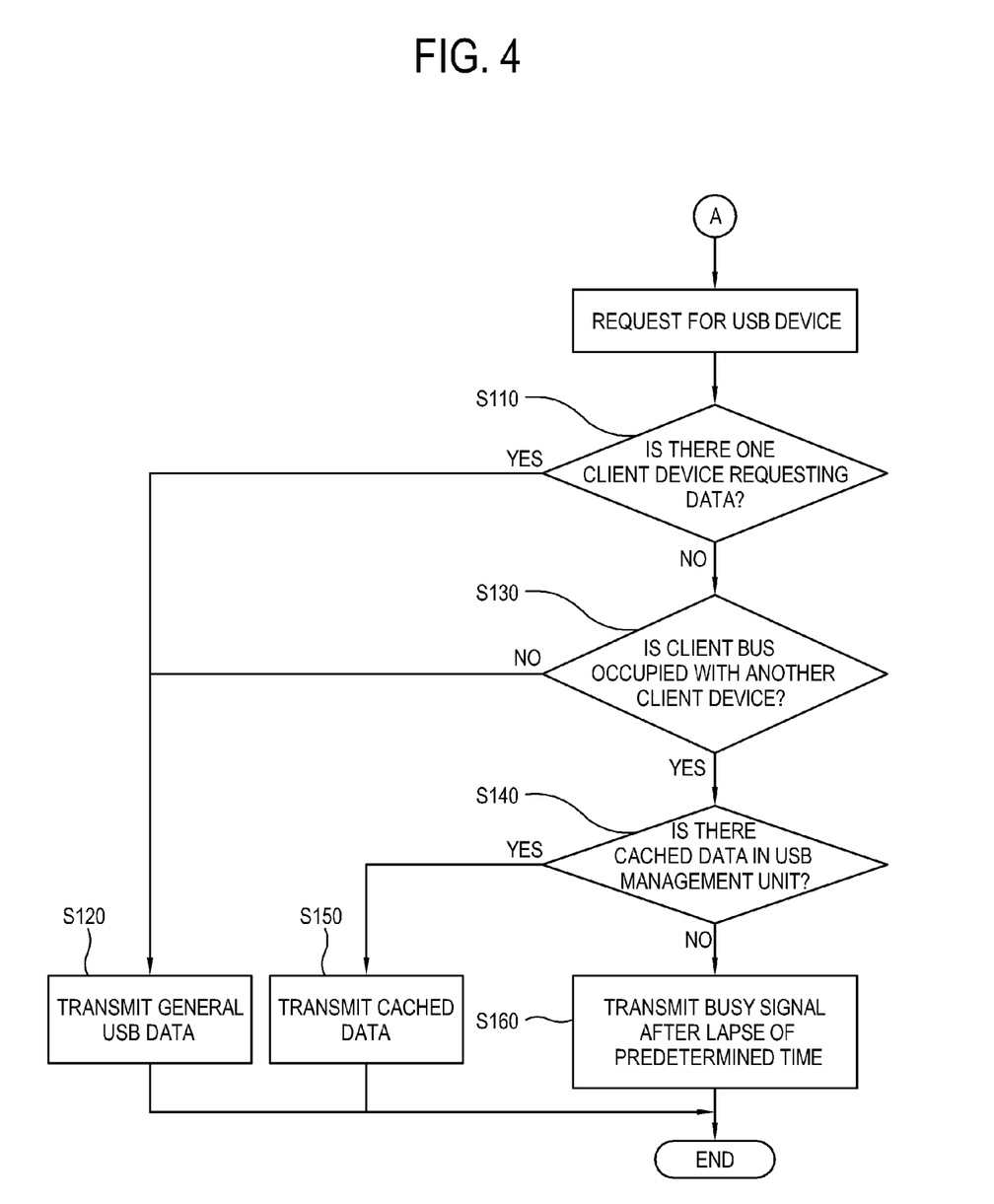
FIG. 4 is a control flowchart for explaining a method where a client device shares data according to an exemplary embodiment.

FIG. 4 is a control flowchart for explaining a method where a client device shares data. The server device 100 in this exemplary embodiment may support multitasking where the plurality of client devices 300 connected to the USB device 200 can use the functions of the USB device 200.

The USB management unit 130 may cache predetermined data the USB device 200 has. The data to be cached may include data having a small size to process a function among the functions provided in the USB device 200, or data frequently requested by the client device 300. The USB management unit 130 may cache at least one of a file list, a play list, a still image, etc.

As shown in FIG. 3, if the request A for the data transmission is received from the client device 300, the USB management unit 130 determines whether one client device 300 corresponds to the current data request (S110).

If it is determined that one client device 300 is connected, general data transmission of the USB device 200 is performed (S120).

On the other hand, if there are the plural client devices 300 corresponding to the current data requests, the USB management unit 130 determines whether a client bus is occupied with another client device (S130). That is, it is determined whether the function of the USB device 200 is being used.

If the function of the USB device 200 is not used, the function can be used in general data transmission of the USB device 200.

On the other hand, if it is determined that the client bus is occupied with another client device, i.e., with a first client device that firstly requests data, the USB management unit 130 determines whether the requested data is cached, i.e. whether there is cached data (S140).

If there is cached data, the data is transmitted to a second client device that lastly requests the data (S150).

For example, while the first client device that firstly occupies the client bus plays an MP3 file, the second client device may search a play list or album information of the MP3 files. While the first client device plays a moving picture file, the second client device may perform a slide show of still images.

On the other hand, if there is no caching data of the data requested by the second client device 300, the USB management unit 130 transmits a signal of "BUSY" to the second client device 300 after a lapse of predetermined time (S160), in which the signal informs that the USB device 200 is occupied with another device (e.g., the first client device).

Since the first client device currently occupying the client bus may terminate the use of the USB device 200 or be disconnected from the USB device 200, the USB management nit 130 transmits the "BUSY" signal to the second client device 300 after a lapse of predetermined time.

Of course, the cached data may be transmitted to both the first client device and the second client device.

Figure 5:
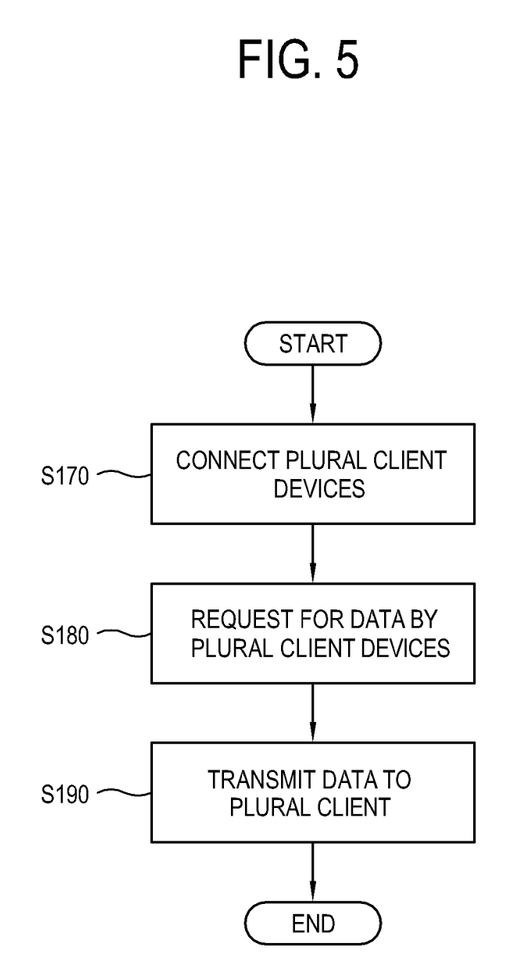
FIG. 5 is a control flowchart for explaining a method of making a client device share data according to another exemplary embodiment.

FIG. 5 is a control flowchart for explaining a method of making a client device share data according to another exemplary embodiment.

As shown therein, the plurality of client devices 300 may be connected to the USB device 200 (S170), and request data from the USB device 200 at the same time with a time difference (S180).

In this case, the USB management unit 130 transmits the data requested by the plurality of client devices 300 to the respective client device 300 through time sharing (S190). For example, the plurality of client devices 300 may play a music file or implement a document job. In this case, even though the data is not cached as shown in FIG. 4, it is possible to transmit the data to the plurality of client devices 300. The data transmitted to the client devices 300 through the time sharing may be determined in consideration of the amount of buffered data, the speed and efficiency of the data bus, etc.

Figure 6:
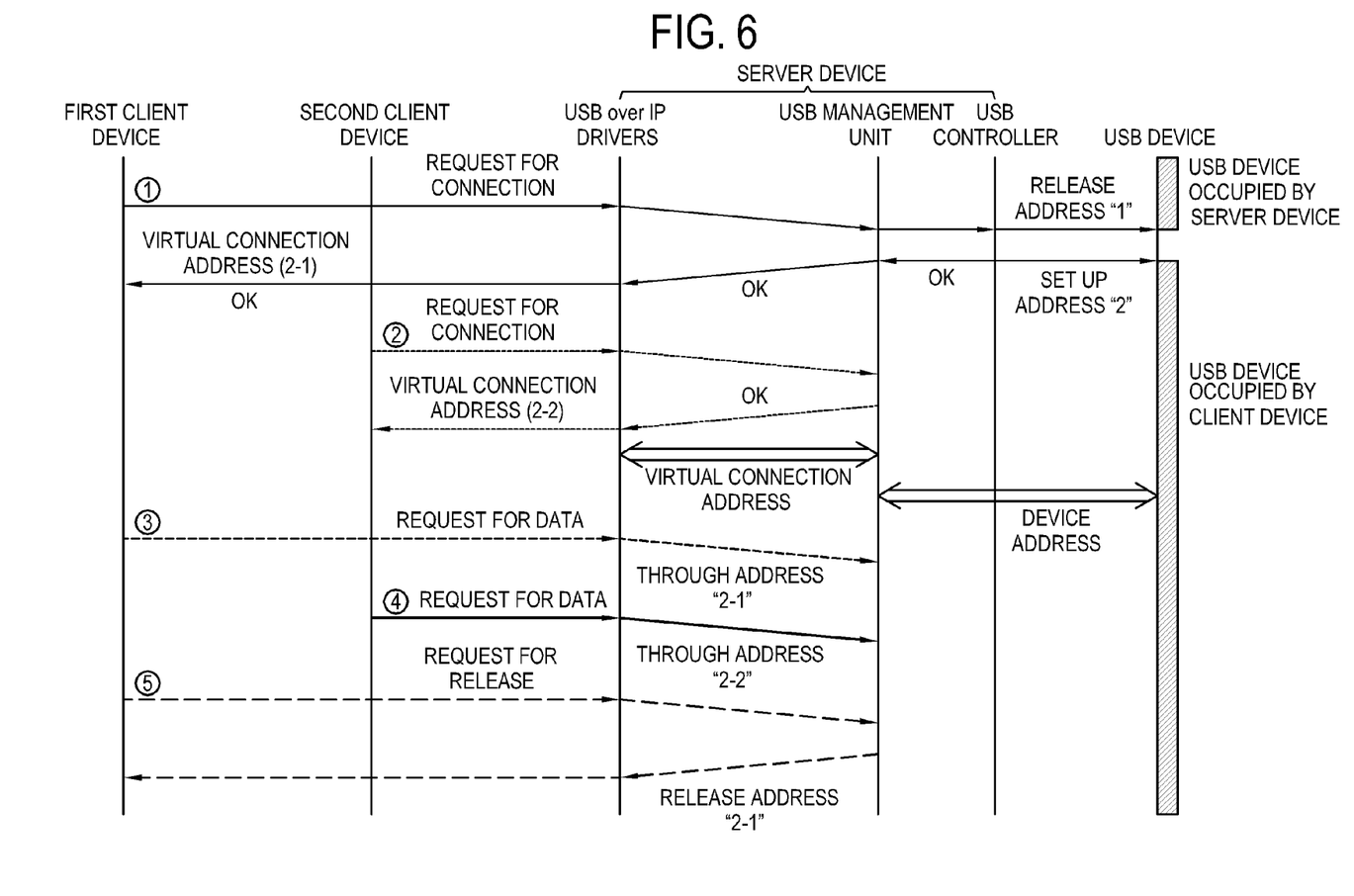
FIG. 6 is a control flowchart for explaining that a plurality of client devices are shared according to an exemplary embodiment.

FIG. 6 is a control flowchart for explaining that a plurality of client devices is shared according to an exemplary embodiment. FIG. 6 shows that the USB management unit 130 allows the plurality of client devices 300 to occupy the USB device 200. The line ① shows a procedure that the first client device 310 requests connection to the USB management unit 130. The connection request of the first client device 310 is transmitted to the USB management unit 130 via the USB-over-IP driver. Through the USB controller 120, the USB management unit 130 releases the device address "1" between the existing server device 100 and the USB device 200, and sets up the device address "2" for connection with another host device. The USB management unit 130 allocates a virtual connection address "2-1" for the first client device 310.

The line ② shows a procedure that the second client device 320 requests connection to the USB management unit 130. Likewise, the connection request of the second client device 320 is transmitted to the USB management unit 130 via the USB-over-IP driver. The USB management unit 130 allocates a virtual connection address "2-2" for the second client device 320. Although the connection request is generated by the second client device 320, the device address "2" is not released and thus the connection between the USB device 200 and the host device using the same is continued without release since the device address "2" is set up. In other words, the USB management unit 130 communicates with the first client device 310 and the second client device 320 through the virtual connection addresses, and communicates with the USB device 200 through the device address.

The lines ③ and ④ show that the virtual connection addresses are respectively used when the first client device 310 and the second client device 320 request data.

The line shows that the USB management unit 130 releases the virtual connection address "2-2" when the release is requested by the first client device 310. If the second client device 320 is being connected even though the release is requested by the first client device 310, the device address "2" is not released.

As mentioned above, there are provided a server device and a device sharing method, in which a plurality of client devices can have connection and access to a USB device, and the plurality of client devices can share data of the USB device.

Also, there are provided a server device and a device sharing method, in which a plurality of client devices can share data of a USB device through data caching.

Further, there are provided a server device and a device sharing method, in which a plurality of client devices can share data of a USB device through data time sharing.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A server device capable of sharing a universal serial bus (USB) device with a client device through a network, the server device comprising:
    a USB controller which sets up connection information containing a device address of a connected USB device; and
    a USB management unit which stores the connection information, allocates a virtual connection address for connecting the client device to the USB device and connects the client device to the USB device by mapping the virtual connection address with the device address in response to the client device requesting sharing with the USB device,
    wherein the USB management unit allocates a first virtual connection address for connecting a first client device of the client device to the USB device and a second virtual connection address for connecting a second client device of the client device to the USB device, and
    wherein the first virtual connection address and the second virtual connection address correspond to a same device address of the connected USB device.

2. The server device according to claim 1, wherein the USB management unit stores a network address of the client device, the virtual connection address, and the connection information in a virtual address table.

3. The server device according to claim 2, wherein the USB management unit transmits the connection information stored in the virtual address table to the client device in response to the client device requesting sharing with a USB device registered in the virtual address table.

4. The server device according to claim 1, wherein the USB management unit communicates with the USB device through the device address, and communicates with the client device through the virtual connection address.

5. The server device according to claim 1, wherein the USB management unit caches predetermined data included in the client device.

6. The server device according to claim 5, wherein the data comprises at least one of a file list, a play list, and a still image.

7. The server device according to claim 5, wherein if a first client device and a second client device request data, the USB management unit determines whether data requested by the first client device and the second client device is cached, and transmits cached data to at least one of the first client device and the second client device if it is determined that the requested data is cached.

8. The server device according to claim 1, wherein if a first client device and a second client device request for data, the USB management unit transmits data requested by the first client device and data requested by the second client device through time sharing.

9. The server device according to claim 1, wherein the server device further comprises a USB driver which drives the connected USB device.

10. The server device according to claim 1, wherein the server device further comprises a USB-over-IP driver which connects the virtual USB controller with the USB device in response to the client device being connected with the server device.

11. A device sharing method of a server device capable of sharing a universal serial bus (USB) device with a client device through a network, the device sharing method comprising:
    setting up connection information containing a device address of a connected USB device;
    storing the connection information in response to the client device requesting sharing with the USB device;
    allocating a virtual connection address for connecting the client device to the USB device; and
    mapping the virtual connection address with the device address in response to the client device requesting sharing with the USB device, wherein the allocating the virtual connection address for connecting the client device to the USB device further comprises:
allocating a first virtual connection address for connecting a first client device of the client device to the USB device and a second virtual connection address for connecting a second client device of the client device to the USB device, and
wherein the first virtual connection address and the second virtual connection address correspond to a same device address of the connected USB device.

12. The device sharing method according to claim 11, wherein the storing the connection information comprises storing a network address of the client device, the virtual connection address, and the connection information in a virtual address table.

13. The device sharing method according to claim 11, further comprising communicating with the USB device through the device address, and communicating with the client device through the virtual connection address.

14. The device sharing method according to claim 11, further comprising caching predetermined data included in the client device.

15. The device sharing method according to claim 14, wherein the data comprises at least one of a file list, a play list, and a still image.

16. The device sharing method according to claim 14, further comprising determining whether data requested by the first client device and the second client device is cached, if a first client device and a second client device request data; and
transmitting cached data to at least one of the first client device and the second client device, if it is determined that the requested data is cached.

17. The device sharing method according to claim 11, further comprising transmitting data requested by the first client device and data requested by the second client device through time sharing if a first client device and a second client device request data.

* * * * *